United States Patent [19]
Thomas

[11] Patent Number: 4,728,185
[45] Date of Patent: Mar. 1, 1988

[54] IMAGING SYSTEM

[75] Inventor: David A. Thomas, Columbia, Md.

[73] Assignee: Texas Instruments Incorporated, Dallas, Tex.

[21] Appl. No.: 18,795

[22] Filed: Feb. 20, 1987

Related U.S. Application Data

[63] Continuation of Ser. No. 752,227, Jul. 3, 1985, abandoned.

[51] Int. Cl.$^4$ ............................................. G03B 21/00
[52] U.S. Cl. ................................................... 353/122
[58] Field of Search ................ 353/121, 122; 358/233; 350/360, 359

[56] References Cited

U.S. PATENT DOCUMENTS 3,345,462 10/1967 Good et al. ........................... 358/233
3,886,310 5/1975 Guldberg et al. ..................... 358/231
4,229,732 10/1980 Hartstein et al. ................ 358/233 X
4,389,906 6/1983 Hori et al. ........................ 358/231 X Primary Examiner—Harry N. Haroian
Attorney, Agent, or Firm—Carlton H. Hoel; Leo N. Heiting; Melvin Sharp

[57] ABSTRACT

Optical systems for imaging activated pixels of a linear cantilever beam light valve (14) on a receptor or screen (24) are disclosed. The systems include a light source (12), a condenser lens (16) and pupil mask (26) forming a beam (32) from the output of the light source (12), a relay lens (18) for the beam (32) to image the pupil mask (26) onto the linear cantilever beam light valve (14), and an imaging lens (22) with an optional iris diaphragm (50) for imaging the portion of the beam (32) reflected from activated pixels of the light valve (14) onto the receptor or screen (24) while blocking the portion of the beam (32) reflected or diffracted from the remainder of the light valve (14).

9 Claims, 11 Drawing Figures

M = SPHERICAL REFLECTOR
S = TUNGSTEN LAMP FILAMENT
C = CONDENSER LENS
PM = PUPIL MASK
SM = SOURCE MASK
R = RELAY LENS

F = FOLD MIRROR
L = LIGHT VALVE
I = IMAGER LENS
UB = UNMODULATED BEAM
MB = MODULATED BEAM

CONJUGATES: 12-28-22 AND 26-14-24

P = PUPIL OF IMAGING LENS
F = FOLD MIRROR
S = SIGNAL ENERGY
ID = OPENING IN IRIS DIAPHRAGM

MDO = MULTIPLE DIFFRACTED ORDERS (BACKGROUND, UNMODULATED LIGHT)
IS = IMAGE OF LIGHT SOURCE FORMED BY ZERO-ORDER UNMODULATED LIGHT

IMAGING SYSTEM

This application is a continuation of application Ser. No. 752,227 filed July 3, 1985, abandoned.

BACKGROUND OF THE INVENTION

The present invention relates to optical systems, and, more particularly, to Schlieren imaging systems.

Light valves, or spatial light modulators, have been used in conjunction with Schlieren imaging systems for many years in projector applications where large, bright displays of video information are required. In these projectors, the electronic video information is converted into corresponding phase perturbations across a beam of light by the spatial light modulator. The Schlieren imaging system then converts the phase modulations across the light beam leaving the modulator into light intensity variations at a viewing screen by blocking the unmodulated light and passing a large fraction of the light incident to modulated areas on the light valve. An optical printer based on this approach has also been recently proposed and converts the modulated light to printed form by xerography. Light valve projectors have at least two features that are important in display or printing applications. The light valves themselves are electronically addressable in an areal (display) or linear (printing) manner. This feature makes it possible to present electronically generated data in "real time". Secondly, the light valve is used to gate or control the light from a separate, external source. The properties of the light source can thus be chosen independently to meet system size, power, and cost requirements while achieving the desired display or photoreceptor irradiance level.

Since the attainment of the highest possible light level at the final image plane has been a goal of all light valve projector systems, bright, compact light sources such as arc lamps or lasers have traditionally been used together with efficient optical configurations having the highest possible optical throughput. The light modulating characteristics of the light valve and the configuration of the Schlieren stop that is used with it have a critical impact on the attainable optical efficiency. The stop must be tailored to the light valve in order to both efficiently block the background unmodulated light and pass a large fraction of the signal energy that is diffracted from the modulated areas of the light valve.

Several different light valve technologies have been utilized to date, each one incorporating a different type of stop plane discrimination. A brief overview of some of these technologies will be presented together with proposed improvements to the optical system that has been used with previous cantilever beam light valves.

The oldest of the light valve technologies is the electrostatically deformable oil film. It has been incorporated into both the Eidophor theatre projector system and the General Electric color television projector ("Color Television Light Valve Projection Systems," IEEE International Convention, Session 26/1, 1–8 (1973)). In both systems, a continuous oil film is scanned in raster fashion with an electron beam that is modulated so as to create a spatially periodic distribution of deposited charge within each resolvable pixel area on the oil film. This charge distribution results in the creation of a phase grating within each pixel by virtue of the electrostatic attraction between the oil film surface and the supporting substrate, which is maintained at constant potential. This attractive force causes the surface of the film to deform by an amount proportional to the quantity of deposited charge. The modulated light valve is illuminated with spatially coherent light from a Xenon arc lamp. Light incident to modulated pixels on the oil film is diffracted by the local phase gratings into a discrete set of regularly spaced orders which are made to fall on a Schlieren stop consisting of a periodic array of alternating clear and opaque bars by part of the optical system. The spacing of the Schlieren stop bars is chosen to match the spacing of the diffracted signal orders at the stop plane so that high optical throughput efficiency is achieved. Light that is incident to unmodulated regions of the light valve is blocked from reaching the projection lens by the opaque bars of the Schlieren stop. Images formed of unmodulated areas on the light valve by the Schlieren imaging system on the projecting screen are therefore dark, while the phase perturbations introduced by the modulated electron beam are converted into bright spots of light at the screen by the Schlieren projector.

The Eidophor and the General Electric light valve projector are commerically available products that have been used for educational, entertainment, military, and NASA applications where a display suitable for a very large audience is required. They are both large, heavy, and expensive and thus unsuitable for high volume, low cost display or printer applications.

Several efforts have been made to improve on the size, cost, and manufacturability of the oil film projectors ("Survey of Developmental Light Valve Systems," IEEE International Convention, Session 26/2, 1–10 (1973)). Many of these efforts have concentrated on replacing the oil film by a thin, reflective membrane that is mounted to the faceplate of a CRT by means of a support grid structure. These light valves are thus also addressed by a raster scanned electron beam. An electrostatic force of attraction is generated between the charge deposited on the glass faceplate by the electron beam and the membrane, which is held at constant voltage. This attractive force causes the membrane to sag into the well formed by the grid structure, thereby forming a miniature spherical mirror at each modulated pixel location. The light diffracted from this type of modulated pixel is concentrated into a relatively narrow cone that is rotationally symmetric about the specularly reflected beam. This type of light valve must thus be used with a Schlieren stop that consists of a single central obscuration positioned and sized so as to block the image of the arc source that is formed by the optical system after specular reflection from unmodulated areas of the light valve. Modulated pixels give rise to a circular patch of light at the Schlieren stop plane that is larger than the central obscuration, but centered on it. The stop efficiency, or fraction of the modulated pixel energy that clears the Schlieren stop, is generally somewhat lower for projectors based on deformable membranes than it is for the oil film projectors discussed above.

Light valve projectors based on deformable membranes have never been turned into commercial products for at least two reasons. The fabrication process is very susceptible to defects that result when even small, micron sized particles are trapped between the membrane and the underlying support grid stucture. The membrane would form a "tent" over these trapped particles whose lateral extent is much larger than the size of the particle itself, and these tents would in turn be imaged as bright defect spots by a Schlieren imaging system. There are also addressing problems caused by slight misalignments between the electron beam raster and the pixel support grid structure. Such misalignments would cause image blurring and nonuniformity in display brightness.

Another light valve projection system incorporating a central obstruction type of Schlieren stop has recently been devised specifically for an optical printing application. ("Linear Total Internal Reflection Spatial Light Molecular for Laser Printing," Proc. SPIE, 299, 68-75 (1981)). The light valve for this application is a hybrid one consisting of a silicon drive chip having a linear array of address electrodes pressed into intimate contact with a polished face on an electro-optic crystal. Laser light that is collimated in the direction perpendicular to the electrodes is incident to the contact surface at an angle greater than the critical angle for the crystal material and is thus totally internally reflected from the interface. Fringing fields are created in the electro-optic material by applying voltage differences between adjacent pairs of electrodes. These fields change the refractive index of the crystal in the vicinity of the electrodes, and the resulting index gradient diffracts light out of the specular beam in one dimension. A field lens is used to focus all the unmodulated, or specularly reflected light onto a central obscuration at the Schlieren stop plane. Light diffracted from the modulated pixels partially clears this obscuration and is brought to focus at the photoreceptor by the imaging lens. The diffraction efficiencies quoted for this system were similar to those of the deformable membrane light valves. The photoreceptor drum rotates beneath the image of the linear array of light valve pixels to generate a two dimensional page of text.

The silicon integrated circuit addressing scheme used for this light valve is more practical for high volume, low cost printer applications than the previous electron beam addressed light valves. However, the light valve is highly susceptible to fabrication problems due to its hybrid nature. The fringing field strength, and hence the amount of light diffracted from modulated pixels, is sensitive to changes in the air gap thickness between the address electrodes and electro-optic crystal surface of less than 0.1 micron. Hence, even very small particles trapped between the crystal and electrode structure could cause illumination nonuniformity problems at the photoreceptor. The system optical response for pixels located at the boundary between modulated and unmodulated areas of the light valve is also significantly lower than the response for pixels near the middle of a modulated region due to the nature of the addressing technique. A commercially available printer based on this technology has not been introduced to date.

The remaining light valve technology that has received significant interest for projection applications is the cantilever beam spatial light modulator. This type of light valve consists of an array of micromechanical cantilever beams that can be electrostatically deflected. The first work on this technology was done by Westinghouse ("The Mirror-Matrix Tube: A Novel Light Valve for Projection Displays," IEEE Trans. on Electron Devices, ED-22, 765-775 (1975), U.S. Pat. No. 3,886,310 (May 27, 1975)) using a cloverleaf beam geometry. Each cloverleaf consists of four cantilever beams which are joined at one corner to a common central support post. An area array of pixels is fabricated on the sapphire faceplate of a CRT and is thus addressed by a scanning electron beam. The electron beam deposits charge on the cantilever beams themselves, thereby creating an electrostatic force of attraction between the cloverleaves and an underlying electrode grid structure that is held at constant potential. This attractive force causes the cantilever beams to bend at their hinge points toward the electrodes.

Deflected beams are imaged onto a projection screen as bright points of light in the following manner. Light that is reflected from flat, unmodulated areas of the device appears at the Schlieren stop plane as a cross-shaped diffracted background. The two arms of the cross are generated by diffraction from the lithographically defined edges of the pixels and are thus oriented prependicular to those edges. An opaque, cross-shaped obscuration is therefore placed at the center of the Schlieren imaging lens pupil to prevent this diffracted background from reaching the projection screen. Light reflected from deflected pixels is deviated out of the unmodulated beam by an angle equal to twice the pixel deflection angle. Since the pixels are hinged at a corner, they bend at a 45 degree angle with respect to their edges, and the signal energy appears at the Schlieren stop plane as patches of light in the unobscured quadrants of the imager pupil. The use of this so-called "45 degree stop discrimination" thus permits the signal energy to be placed in the region of the lens pupil where the diffracted background is minimized. It is a key feature of the Westinghouse approach that results in a good contrast ratio at the Schlieren image of a cantilever beam light valve even with small pixel bend angles on the order of a few degrees. The lateral separation that is obtained between the diffracted background and deflected signal energy at the Schlieren stop plane for projectors based on cantilever beam light valves also guarantees good optical throughput or high stop efficiency provided the achievable pixel bend angle is larger than the angular size of the light source as seen by the light valve.

The Westinghouse Mirror Matrix Tube offers no significant advantage over conventional projection CRT's in terms of either cost or performance. It also suffers from the problem of maintaining precise registration between the electron beam raster and the array of spatial light modulator pixels. IBM has sought to bypass these problems, which are inherent to any electron beam addressed light valve, by developing a cantilever beam device that could be integrated with its own drive circuitry onto a silicon chip. Two different implementations have been described in the literature. The first ("Dynamic Micromechanics on Silicon: Techniques and Devices," IEEE Trans. on Electron Devices, ED-25, 1241-1250 (1978)) involves the use of a 16 element linear array of "diving board" type pixels. This device does not have on-chip addressing, and it does not incorporate 45 degree stop discrimination into its pixel design. The device is laser illuminated and imaged onto a ground glass screen by means of a Schlieren imaging system that uses a scanning galvanometer mirror to generate an alphanumeric message on the screen. Few details were given regarding the optical performance of the system except that an 8:1 contrast ratio was achieved. The second implementation was described in U.S. Pat. No. 4,229,732 (Oct. 21, 1980). This device consists of an area array of cantilever beam pixels, each of which is comprised of a single flap hinged at one corner. Light reflected from deflected pixels on this device would therefore be directed into only one quadrant of the Schlieren stop plane in the Westinghouse projector. The patent suggests that the light valve be used in display applications with "standard Schlieren image projection systems" appropriate for this light valve technology.

The cantilever beam light valve technology seems to be the most appropriate one for low cost, high volume Schlieren projection applications if it can be successfully fabricated on a silicon chip with an architecture having good optical properties. Such a device could be fabricated with MOS technology to include on-chip address electronics, and it would have a relatively low susceptibility to particulate contamination. Westinghouse has also shown that good contrast ratio and a high stop efficiency can be obtained for reasonable pixel deflection angles if 45 degree stop discrimination is utilized. The only projection system and Schlieren stop configuration that has been proposed for use with cantilever beam light valves incorporating 45 degree stop discrimination is the one used by Westinghouse. This system is believed to have the following fundamental limitations in terms of attainable optical performance.

(1) The aperture diameter of the imaging lens must be larger than is necessary to pass the signal energy alone. Hence the speed of the lens must be relatively high (or, equivalently, its F-number must be relatively low) to pass all the signal energy around the central Schlieren stop obscuration.

In addition, the signal passes through the outer portion of the lens pupil in this imaging configuration. Rays of light emanating from any given point on the light valve and passing through the outermost areas of an imager lens pupil are the most difficult ones to bring to a well-corrected focus during the optical design of any imaging lens. When the outer rays are brought under good control, the rays passing through the center of the imager lens are automatically well corrected. Hence a greater level of optical design complexity is required of the imaging lens by the Westinghouse configuration.

(2) The field angle over which the imaging lens can form well corrected images of off-axis pixels on a cantilever beam light valve is also restricted by the use of the Westinghouse system. Any lens design task involves a compromise between the speed of the lens and the field angle it can cover with good image quality. Fast (low F-number) lenses tend to work over small fields, while wide angle lenses tend to be relatively slow (high F-number). Since the Schlieren imager must be well corrected over its entire aperture, and since this aperture is larger in diameter than is required to pass the image forming light, the field angle that can be covered by the lens is smaller than it could be if a different imaging configuration could be devised in which the signal was passed through the center of an unobscured, smaller diameter lens.

(3) For an imager lens having a given finite speed, the use of the Westinghouse Schlieren stop configuration also limits the size of the light source that can be utilized. This in turn limits the irradiance level that can be delivered to a projection screen or a photoreceptor at the image of a deflected pixel. This irradiance level, or the delivered power per unit area, depends on the product of the radiance of the light source, the transmittance of the optical system, and the solid angle of the cone of image forming rays of light. The source radiance is determined only the the particular lamp that is used. The optics transmittance depends on the stop efficiency for the particular light valve/Schlieren stop configuration and surface transmission losses. But the solid angle of the image forming cone of light is directly proportional to the area of the imager lens pupil that is filled with signal energy. The use of a Schlieren stop that obscures the central area of the imager lens pupil limits the useable pupil area and thus the image plane irradiance level that can be obtained for a lens of a given speed and a source of a given radiance.

DESCRIPTION OF THE PREFERRED EMBODIMENTS

Figure 1:
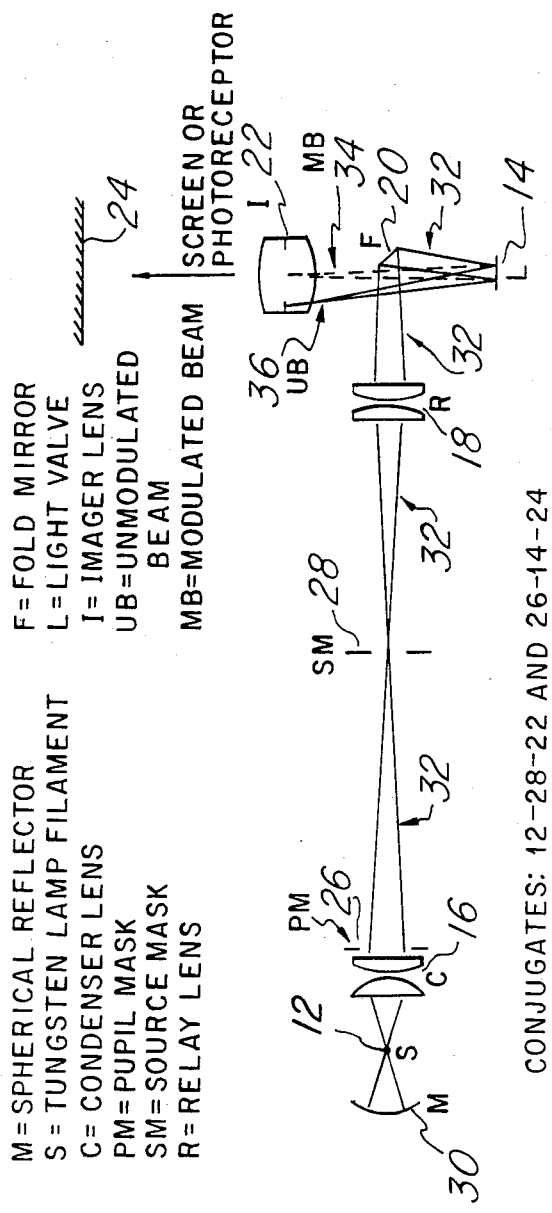
FIG. 1 is a schematic view of a first preferred embodiment system.

The invention is thought to be particularly relevant to a low cost optical printing application where a long linear light valve is to be used with a low cost, extended light source such as a tungsten halogen lamp. The advantages of the invention are, however, applicable to both optical printing and projection display applications incorporating area or linear arrays and any type of light source. All three preferred embodiments make use of 45 degree stop discrimination.

The first preferred embodiment is suitable for light valves having single beam pixels that are deflectable through relatively small angles. It can be explained with the help of the optical system shown in FIG. 1. Light from 150 watt tungsten halogen lamp 12 is directed onto the light valve/spatial light modulator 14 by means of illuminator optics consisting of two groups of condenser quality lenses 16, 18 and fold mirror 20. The reflective light valve 14 is centered on and normal to the optical axis of imaging lens 22 which forms a well-corrected image of the device on screen or photoreceptor 24 at the desired magnification. Uniform illumination of light valve 14 is assured by imaging the pupil of the condenser lens group 16 onto light valve 14 with the relay lens 18. Light diffracted from address electrode structure in the outlying areas of the light valve 14 would constitute stray light that could potentially reduce the contrast ratio of the final image, so pupil mask 26 is placed in the condenser lens 16 pupil that permits only the active area of light valve 14 to be illuminated. An intermediate image of the lamp 12 filament is formed in the plane of source mask 28 that can be used to mark off all but a portion of the lamp 12 filament that has a size appropriate to the pixel bend angle and imaging lens 22 focal lenth and magnification. The portion of the filament thus selected is then reimaged by relay lens 18 into the plane of the imager lens 22 pupil after reflection from both fold mirror 20 and light valve 14. Also shown in FIG. 1 are: mirror 30 for reflecting some of the output of lamp 12 to condenser lens 16; light beam 32 from lamp 12 to light valve 14 through condenser lens 16, pupil mask 26, source mask 28, relay lens 18, and fold mirror 20; modulated light beam 34 which is the portion of light beam 32 reflected off deflected pixels of light valve 14; and unmodulated light beam 36 which is the portion of light beam 32 reflected off the remainder of light valve 14.

For a printer application, light valve 14 may be a 2400 by 1 array of pixels with each pixel having a 0.5 mil square cantilever beam; such a light valve will be described in greater detail below. Also, condenser lens 16 is a collimating lens F/0.8, 35 mm effective focal length (EFL) plus a plano-convex singlet lens 127 mm EFL; relay lens 18 is a pair of plano-convex singlets with 150 mm and 160 mm EFL; imager lens 22 is a Schneider enlarging lens F/5.6, 135 mm EFL; and pupil mask 26 has a 0.5 inch by 40 mil slit. Note that lamp 12, source mask 28, and imager 22 are conjugates; and pupil mask 26, light valve 14, and screen 24 are conjugates.

Figure 2:
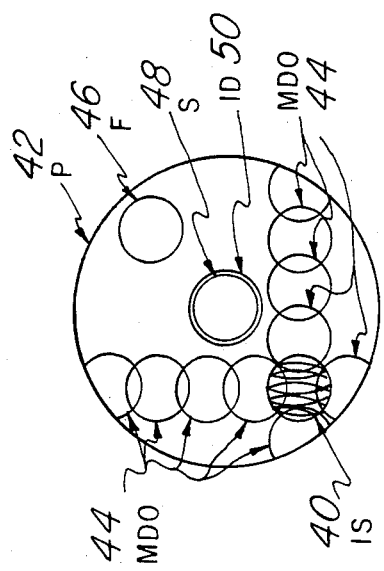
FIG. 2 is a schematic view of the entrance pupil of the imager lens of the first preferred embodiment system.

FIG. 1 shows that the unmodulated light reflected from undeflected regions of the light valve 14 is focused into a peripheral area of the imager lens 22 pupil that is illustrated in greater detail in FIG. 2 which gives the appearance of the entrance pupil of the imager 22 as seen from the light valve 14. The illuminating beam 32 is directed onto the light valve 14 at an oblique angle by fold mirror 20, which is positioned in front of one quadrant of the imager lens 22 pupil (in FIG. 2 the pupil is denoted 42 and the fold mirror 20 position is 46.). Light reflected from unmodulated regions of light valve 14 thus gives rise to a cross-shaped distribution of diffracted light that is positioned near the center of the imager 22 pupil quadrant located diametrically opposite from the fold mirror 20 position 46; this diffracted light is denoted by the circles 44 in FIG. 2 and includes multiple diffraction orders, circle 40 is the zero order unmodulated reflected light. If the cantilever beams are hinged at the appropriate corner, the signal energy reflected from deflected pixels will be deviated out of the unmodulated beam 36 as shown by the dashed rays 34 in FIG. 1 to form a smoothed or blurred image of the lamp 12 filament near the center of imager 22 pupil (see FIG. 2 wherein the image of the lamp 12 filament by modulated light 34 is blurred and numbered 48 and the image by unmodulated light 36 is sharp and numbered 40). The lateral separation between the center of the diffracted signal and the center of the unmodulated background light pattern at the pupil (which also is the Schlieren stop plane) is given by the product of the distance between the light valve 14 and the entrance pupil of the imager 22 and twice the pixel deflection angle. Consideration of the diffraction effects that influence both the signal and the background gives some insight into the factors that ultimately limit the contrast ratio and optical throughput for this system and suggests the best type of stop plane obscuration to use in order to maximize image plane contrast.

The intensity distribution of the background light pattern at the imager lens 22 pupil is comprised of the sum of a multiplicity of broadband Fraunhofer diffraction patterns of the unmodulated area on cantilever beam light valve 14. There is one pattern centered on each point in the geometrical image of the lamp filament formed by light that is specularly reflected from the light valve 14. The zero order diffracted light gives rise to a bright image 40 of the lamp 12 filament at the center of the background light pattern. The higher order diffracted light is mainly concentrated into multiple off-axis images 44 of the lamp 12 filament. These arise due to the periodic nature of the cantilever beam pixel array 14, whose photolithographically defined edges are responsible for most of this diffracted light. The brightest diffracted orders lie along horizontal and vertical bands that are oriented perpendicular to corresponding pixel edges and centered on the zero order image 40 of the lamp 12 filament (see FIG. 2). Dimmer diffracted order do, however, exist over the remaining areas of the imager lens 22 pupil 42.

The finite size of the diffraction point spread function for a single cantilever beam pixel causes the diffraction image of the lamp 12 filament formed by light reflected from the deflected pixels on the light valve 14 to be a smoothed and laterally broadened version of the geometrical filament image. Considerable degradation of the image plane contrast ratio results if this blurred image 48 of the filament, which constitutes the signal, is allowed to overlap the bright cross-shaped portion 40 and 44 of the background. Hence the lateral separation between the center of the diffracted background pattern 40 and 44 and the center of the patch of signal energy 48 at the pupil 42 of the imager lens 22 must be greater than the diameter of the geometrical filament image. This in turn implies that the pixel bend angle must exceed the angular radius of the source of light that is seen by light valve 14. This requirement, combined with the fact that the usable filament image diameter must be less than one third of the imager 22 pupil diameter to avoid having a portion of the signal blocked by system fold mirror 20, puts an upper limit of the pixel bend angle that can be utilized in this imaging configuration for an imager 22 of given speed. For example, an imaging lens 22 having a parent aperture of F/2 would have a maximum usable aperture of under F/6 which in turn corresponds to a maximum usable pixel bend angle of less than 4.8 degrees. Reducing the speed of the imager 22 to improve its field angle coverage would, of course, reduce the pixel deflection that could be utilized and the maximum image irradiance level that could be achieved.

The best type of Schlieren stop to use in this configuration would be an iris diaphragm located in the pupil 42 of the imaging lens 22. Its central opening would be sized and positioned so as to just pass the patch of signal energy 48. This type of obscuration would pass most of the signal 48 while blocking as much of the diffracted background 40 and 44 as possible, thereby optimizing the image plane contrast ratio; see FIG. 2 where such iris diaphragm is denoted 50.

This first preferred embodiment system would not provide a significant radiometric advantage over the traditional one used by Westinghouse. It does, however, have several tangible benefits in other aspects of optical system performance. (1) The amount of background diffracted light transmitted by the Schlieren stop (iris diaphragm 50) should be less than the amount passed by a cross shaped obscuration centered in the imager lens 22 pupil by at least a factor of four. A corresponding improvement in image plane 24 contrast ratio is therefore expected. (2) Despite the fact that a large aperture imaging lens 22 must still be used to pass a relatively small cone of image-forming light, the signal 48 passes through the central third of the imager 22 pupil 42 rather than a peripheral portion of pupil 42. Hence, superior image quality should be achieved in the proposed system over any given field angle by an imaging lens 22 of given speed for the reasons given in the introduction. (3) Since the effective working F-number of the imaging lens 22 is significantly higher than the F-number of its total parent aperture in the proposed configuration, the imager 22 should be capable of producing good imagery over a larger field angle than an equivalent imager in the Westinghouse configuration. A light valve 14 of larger lateral size could thus be used in the proposed system with an imager having a given focal length and working at a given magnification.

Figure 3:
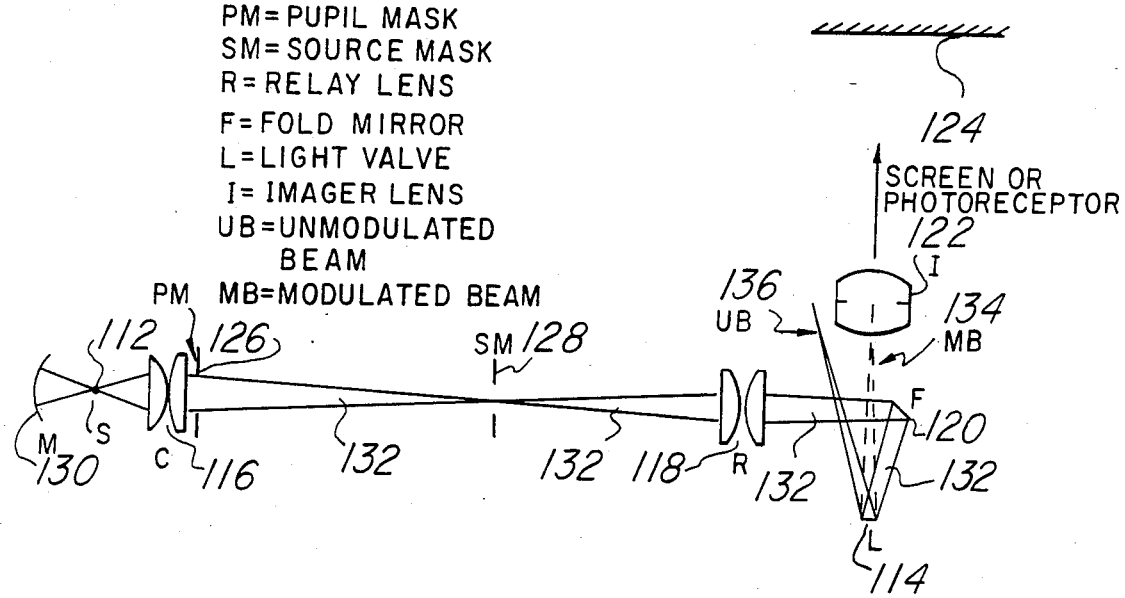
FIG. 3 is a schematic view of a second preferred embodiment system.
Figure 4:
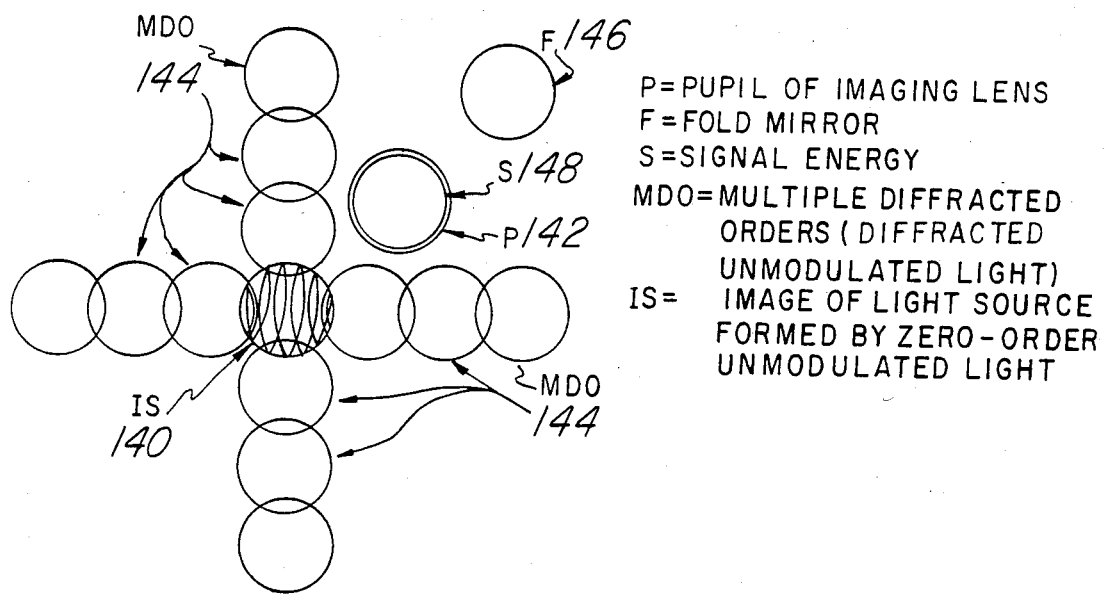
FIG. 4 is a schematic view of the entrance pupil of the imager lens of the second preferred embodiment system.

If relatively large pixel deflection angles are attainable, the second preferred optical configuration shown in FIG. 3 becomes practical. The principles of operation and alignment are very similar to those of the first preferred embodiment but the larger pixel deflection angle permits the diffracted background light pattern to be placed completely outside the collection aperture of imaging lens 122 of moderate speed by proper adjustment of the illuminator optics (see FIG. 4, which is an analog of FIG. 2). This optical configuration may be referred to as a dark field projector in order to distinguish it from the previous Schlieren systems. Rather than using a special obscuration to block the background light, the unobscured pupil 142 of the imaging lens 122 is sized and positioned with respect to the background light 140 and 144 so as to just pass the signal 148 generated by deflected pixels. The pupil 142 of imaging lens 122 itself therefore functions like the opening in the iris diaphragm 50 of the first preferred embodiment.

This second preferred embodiment has all of the performance advantages of the first preferred embodiment plus two additional ones. (1) The smaller physical aperture size of the imager 122 reduces the weight, size, and possibly the cost of the projector system. It also allows the projector to be fit into a more compact package. (2) A higher light level can be achieved at the image plane 124, because larger pixel bend angles can be utilized with the dark field configuration than would be practical for use with the previous systems. The image plane 124 irradiance level is proportional to the area of the imager lens 122 pupil 142 that is filled with signal energy 148 for a lens of given focal length and magnification. This area is in turn proportional to the square of the diameter of the patch of signal energy 148 and hence the square of the pixel deflection angle. Doubling the usable pixel bend angle thus increases the image plane 124 irradiance level by a factor of four. Since the unmodulated light 140 and 144 is placed outside the aperture of the imaging lens 122, this gain in image plane 124 light level can be achieved with a dark field imaging lens of moderate speed even for relatively large pixel deflection angles. For example, a 6 degree pixel bend angle would require only an F/4.8 dark field imaging lens to pass all of the deflected signal energy.

Figure 5:
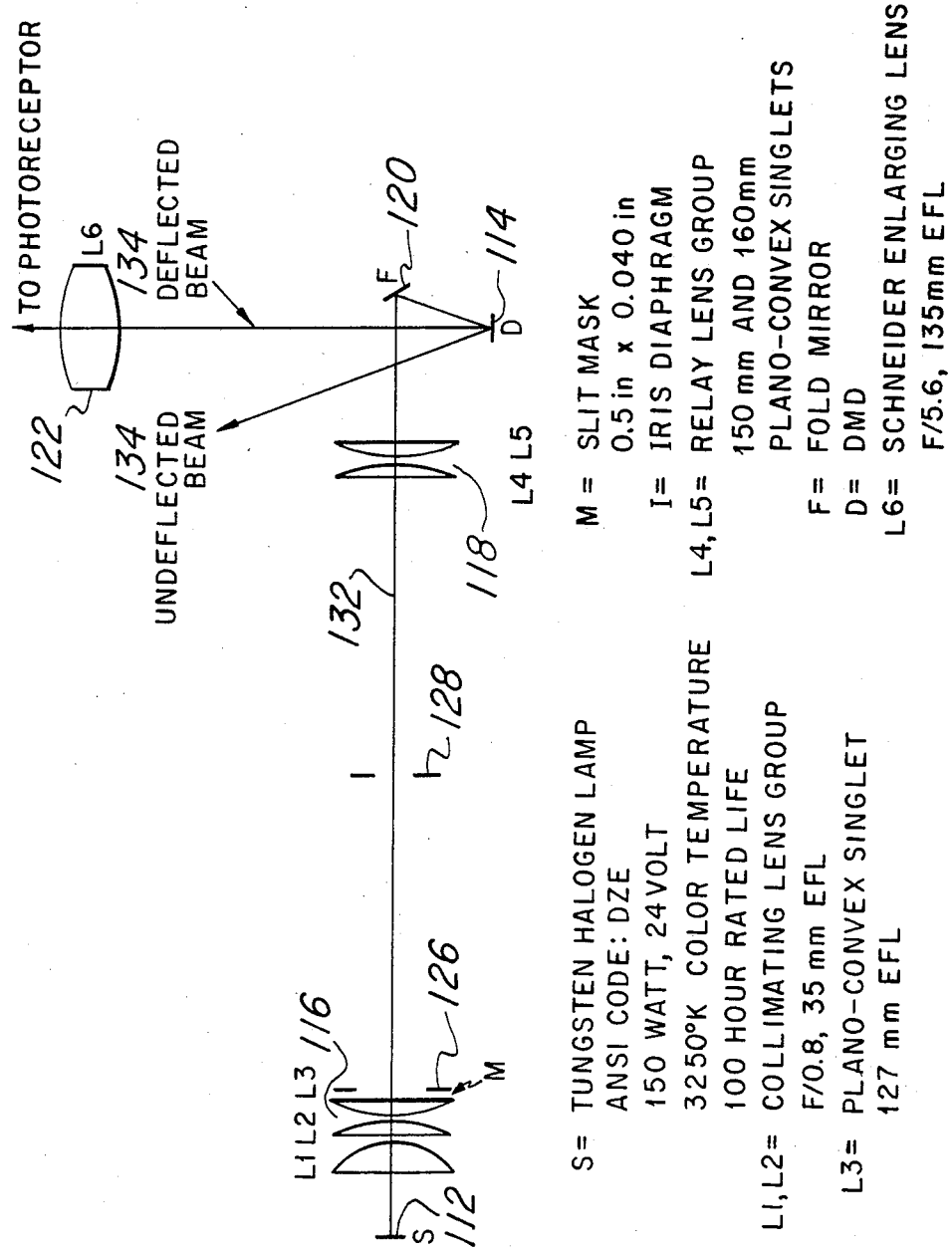
FIG. 5 is a schematic view of a variation of the second preferred embodiment system.
Figure 6:
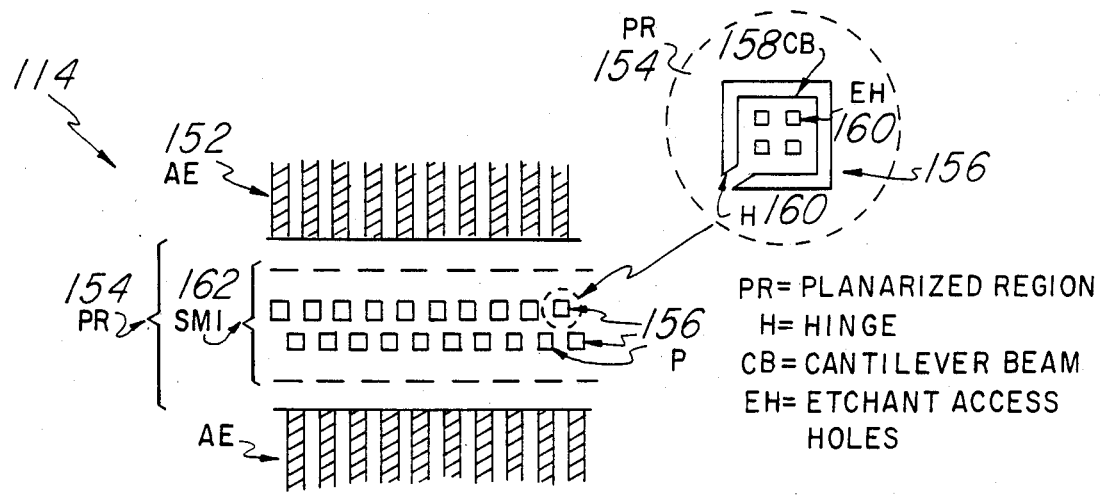
FIG. 6 is a schematic plan view of the light valve for the preferred embodiments.

FIG. 5 illustrates the second preferred embodiment system with off-the-shelf components. A 135 mm focal length Schneider enlarging lens is used for imager 122, and the light source 112 is a 150 wall tungsten halogen lamp. The system incorporates a cantilever beam light valve 114 (also called a Deformable Mirror Device or DMD) which is an all MOS-compatible silicon device incorporating integrated address electronics. A sketch showing the relevant optical properties of the light valve 114 chip that is used for the printing application is given in FIG. 6. The outermost region 152 of the light valve 114 chip contains the address electrode structure. The central part 154 of the light valve 114 chip is a planarized region over which nearly all of the relief structure due to the electrodes has been eliminated. Centered in this planarized region 154 are the 2400 pixels themselves; illustrative pixels are numbered 156 in FIG. 6. The pixels are 12.7 microns square and are placed on 25.4 micron centers for a total length of 1.2 inches. The two rows of pixels are separated by 25.4 microns. The cantilever beams 158 are hinged at a common corner 160 as indicated by the inset in FIG. 6.

The cantilever beams in each pixel cell are defined in the following manner. The entire planarized region is coated with aluminum. The aluminized area is then coated with photoresist which is subsequently exposed to the desired pixel geometry during a photolithography step. The aluminum support layer in the vicinity of each pixel is then etched away leaving an aluminum cantilever beam supported by a hinge over a well of air and an underlying address electrode. The four holes (see FIG. 6 insert item 160) present in each beam are required to provide the etchant ample access to the support layer. These etch holes remove only a few percent of the available reflecting area from each cantilever beam, and their potentially adverse effects on optical performance are thus thought to be slight. The slots formed in the aluminum surface when the cantilever beams are defined diffract considerable light out of the specularly reflected beam. The manner in which this diffracted background is taken into account during the alignment of the optical system has already been explained.

In order to avoid the generation of excessive background light that could reduce image contrast, the outlying address electrode structure should not be illuminated. This was accomplished by placing pupil mask 126 (also called a slit mask and consisting of a slot cut in an aluminum plate) at the pupil of condenser lens 116 group and forming an image 162 of mask 126 at light valve 114 with relay lens group 118; see FIGS. 5 and 6. This slit mask 126 image on the light valve 114 chip is indicated on FIG. 6 as region 162. The width of the mask image does not appear to be critical. It should be wide enough to provide uniform illumination of all light valve pixels yet narrow enough to lie completely within the planarized region of the light valve 114.

Figure 7:
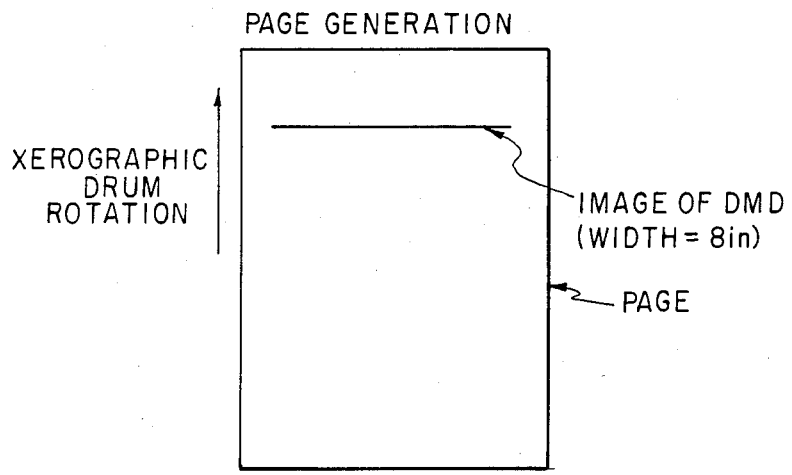
FIGS. 7-8 illustrate the preferred embodiments' images on a xerographic drum.

The static image of light valve 114 is converted into a page of print in the following manner. FIG. 7 shows that the linear light valve 114 array of pixels is imaged onto the photoreceptor in such a way as to fill the narrow dimension of the page. If an 8 inch page width is assumed, the enlarger lens must thus work at a magnification of 6.67 (8/1.2). As the photoreceptor drum rotates beneath the light valve image, a page of text can be written one dot line at a time.

Figure 8:
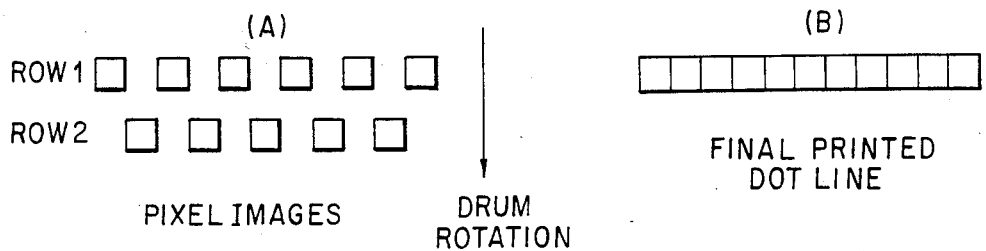

FIG. 8 illustrates in more detail how a single dot line is created. The initial row (1) of pixels is turned on to expose half the dots in a given line of print. The second row of pixels is turned on a short time later to expose the remainder of the dot line. The time delay is determined by the spacing between the two rows of DMD pixels at the drum and the drum rotation speed. Proper selection of the time delay causes the two rows of pixel exposures to line up as shown in FIG. 8b, thus forming a single contiguous row of dots on the drum.

Excellent resolution of the deflected light valve pixels is achieved by the dark field imaging configuration. The highest modulated visible signal per pixel that has been attained at the image plane using preliminary DMD devices is 0.017 uW/pixel. This was the modulated signal level used to obtain xerographic print samples. A maximum stop efficiency of 40% has also been achieved, where this efficiency represents the fraction of the light incident to a deflected pixel on the light valve that passes through the pupil of the dark field imaging lens. This efficiency level is comparable to that of the Westinghouse projection system. For a given irradiance level at the light valve, the stop efficiency (and hence the modulated power level at the image plane) and the image plane contrast ratio have been found to be approximately reciprocally related. A greater fraction of the modulated signal energy is collected by the imaging lens when its iris diameter is increased thereby causing the image plane irradiance level to increase by some factor. Unfortunately, the larger iris diameter also passes a greater fraction of the background diffracted light, which results in a decrease in the image plane contrast ratio by approximately the same factor.

The first two preferred embodiment systems are appropriate for use only with cantilever beam light valves having pixels comprised of single flaps that are hinged at one corner. They are clearly not applicable in cases where each pixel contains several beams hinged at different corners. An example of this type of pixel geometry is the Westinghouse cloverleaf structure. For this type of light valve, the deflected light is directed into several quadrants of the background diffraction pattern that is generated by light reflected from unmodulated portions of the light valve. Hence, the previously proposed imaging configurations would not collect all of the deflected signal energy. A variation of the proposed dark field configuration can, however, be used with cantilever beam light valves having multiple beam pixels provided the modulator is properly configured.

Figure 9:
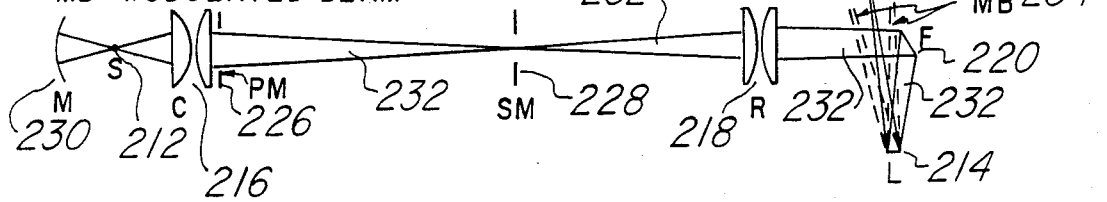
FIG. 9 is a schematic view of a third preferred embodiment system.
Figure 10:
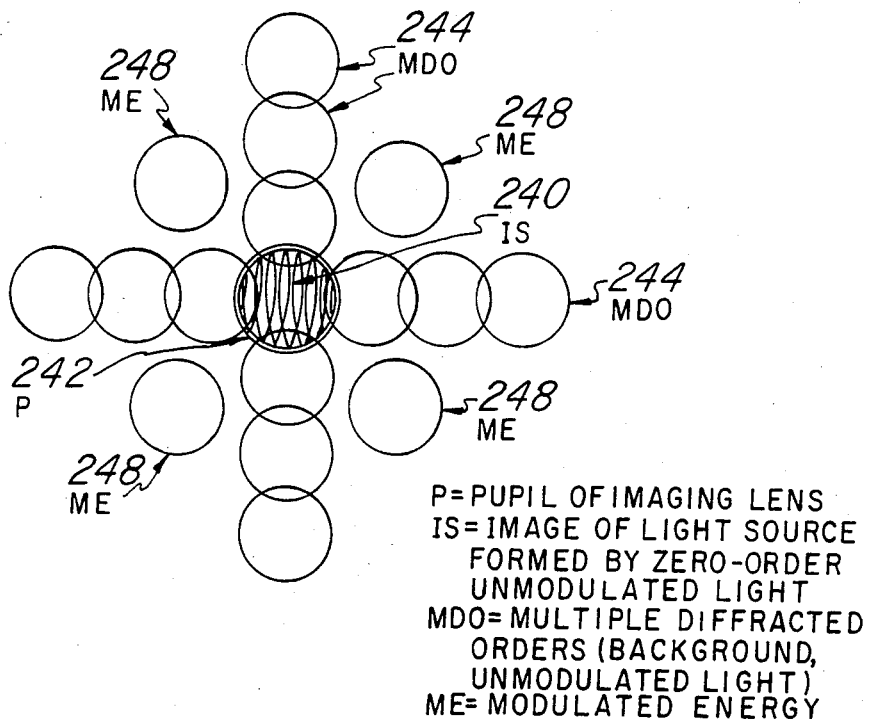
FIG. 10 is a schematic view of the entrance pupil of the imager lens of the third preferred embodiment system.

FIG. 9 illustrates one embodiment of this third preferred embodiment optical system. The alignment of this system is again analagous to that of the previous two, but the principles of its operation are somewhat different. The pupil of an imaging lens 222 of moderate speed is now positioned and sized so as to just pass the lamp 212 filament image formed by the zero-order light 236 diffracted from unmodulated areas of the light valve 214. Higher order diffracted light and the modulated light from deflected pixels lie outside the collection aperture of the imager and are thereby prevented from reaching the image plane 224; see FIG. 10 in which the the imaging lens 222 pupil is denoted 242 and includes the image of light source 212 denoted 240. This imaging configuration therefore operates in a reverse dark field mode—i.e. undeflected pixels are not imaged onto the projection screen or photoreceptor drum as bright spots, while the images formed of deflected pixels are dark.

Inactive, reflective areas of the light valve surface, such as the interstitial regions between adjacent pixels, also appear bright in the image formed by a reverse dark field system. A severe reduction in the area averaged contrast ratio of the final light valve image will result unless the fraction of the illuminated light valve area covered by these inactive regions is relatively small, and the lateral sizes of these features are kept small relative to the dimensions of the cantilever beam pixels. Smaller features on the light valve will diffract light into larger areas of the imager pupil plane, and a smaller fraction of the diffracted light will be transmitted by the imager lens as a result. Keeping the size of an undesirable light valve feature small therefore tends to reduce its relative light level contribution to the final image. Both of the above requirements imply that the "fill factor", or fraction of the light valve surface covered by active modulators used with reverse dark field projectors, must be high.

For a cantilever beam light valve with suitably high fill factor, the proposed reverse dark field imaging configuration has the same basic performance advantages as the previously discussed dark field system. Good contrast ratio, good image quality over a relatively large field angle, and a relatively high image plane irradiance level are all achievable using an imaging lens of moderate speed provided relatively large (5 to 6 degrees) beam deflection angles can be attained.

Figure 11:
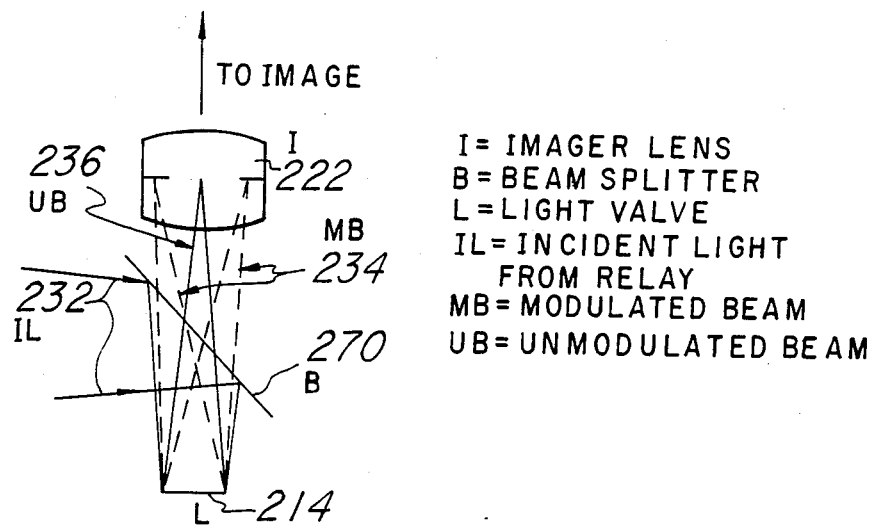
FIG. 11 is a schematic view of a variation of a portion of the third preferred system.

However, since the signal energy is derived from the unmodulated light that is reflected from the light valve 214, the third embodiment shown in FIG. 9 suffers from the disadvantage that the light valve can no longer be centered on the optical axis of imaging lens 222. Hence the system must be used with spatial light modulators of relatively small lateral size despite the inherently large field angle coverage of the imager. This limitation could be removed by using beamsplitter 270 to normally illuminate the light valve as shown in FIG. 11. This would allow light valve 214 to be centered in the field of view of the imager 222 again, but 75% of the signal energy would be sacrificed due to the double passage of light through beamsplitter 270.

Various modifications of the preferred embodiment systems, such as varying the dimensions of the components or inserting additional lenses or mirrors, may be made and still preserve the inventive features of the preferred embodiments.

I claim:

1. An optical system for a light valve, comprising:
   (a) a source of light;
   (b) a lens system, said lens system directing a beam of light from said source onto a light valve;
   (c) said light valve reflecting said beam, with the portion of said reflected beam unmodulated by said light valve forming an image of said source plus diffraction orders at a first region in a plane and with the portion of said reflected beam modulated by said light valve forming an image of said source at a second region in said plane, said first and second regions disjoint; and
   (d) an imaging system located at said plane, said imaging system imaging said light valve onto a receptor with said reflected beam.

2. The optical system of claim 1, wherein:
   (a) said imaging system included an imaging lens in said plane and centered at said second region and disjoint from said first region.

3. The optical system of claim 2, wherein:
   (a) said first region is cross-shaped with each cross arm a plurality of circular regions linearly arranged;
   (b) said second region is circular and centered on a line through the center of said cross-shaped first region and at an angle of 45° to the cross arms; and
   (c) said imaging lens has a pupil approximately equal to said second region.

4. The optical system of claim 1, wherein:

(a) said imaging system includes an imaging lens in said plane and centered at said second region and with an iris diaphragm disjoint from said first region.

5. The optical system of claim 4, wherein:
(a) said first region is cross-shaped with each cross arm a plurality of circular regions linearly arranged;
(b) said second region is circular and centered on a line through the center of said cross-shaped first region and at an angle of 45° to the cross arms; and
(c) said imaging lens has said iris diaphragm approximately equal to said second region.

6. The optical system of claim 1, wherein:
(a) said imaging system included an imaging lens in said plane and centered at said first region.

7. The optical system of claim 6, wherein:
(a) said first region is cross-shaped with each cross arm a plurality of circular regions linearly arranged with a common circular region at the crossing of the cross arms;
(b) said second region has a plurality of subregions, each of said subregions is circular and centered on a line through the center of said cross-shaped first region and at an angle of 45° to the cross arms; and
(c) said imaging lens has a pupil approximately equal to the said common circular region of said first region.

8. The optical system of claim 8, wherein:
(a) said imaging system includes an imaging lens in said plane and centered at said second region and with said light valve centered on the optic axis of said imaging lens.

9. The optical system of claim 8, wherein:
(a) said lens system includes: (i) a condenser lens for said source, (ii) a pupil mask for said condenser lens to define said beam, (iii) a source mask in said beam and conjugate to said source by said condenser lens, and (iv) a relay lens directing said beam onto said light valve and imaging said source mask onto said plane.

* * * * *